Patented June 15, 1943

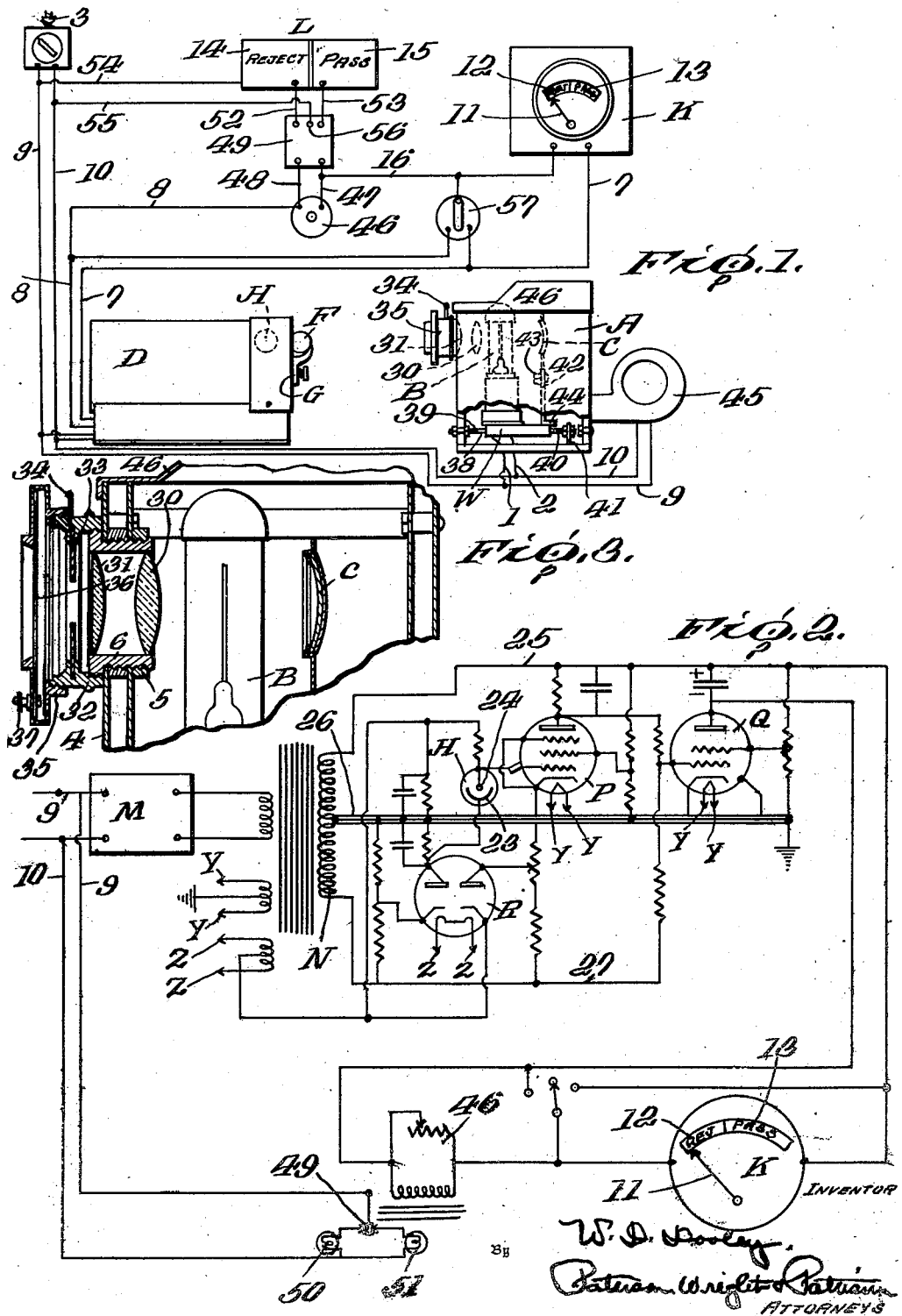
June 15, 1943.　　W. D. DOOLEY　　2,321,899
METHOD AND APPARATUS FOR DETECTING THE
PRESENCE OF BLOOD IN AN EGG
Filed Oct. 10, 1939

2,321,899

UNITED STATES PATENT OFFICE 2,321,899

METHOD AND APPARATUS FOR DETECTING THE PRESENCE OF BLOOD IN EGGS

William D. Dooley, Springfield, Ohio

Application October 10, 1939, Serial No. 298,842

7 Claims. (Cl. 88—14.1)

It is now practically universal practice to classify eggs into grades in accordance with their quality from a marketable standpoint. There are a number of different grades of eggs on the market and the classification of an egg in a particular grade is dependent upon numerous factors the specific natures of which in the most part are of no importance in respect to the present invention.

However one of the grades into which eggs are classified is commonly referred to as "rejects" and among those factors which will classify an egg in this particular class is the presence of blood in the egg.

This blood is ordinarily in the form of a spot on or in the egg yolk. The blood spot will vary from the size of a pin point up to sizes which are of considerably extended area. The presence of any blood whatever in the egg is proper cause to classify the egg as a "reject" but where the spots are small it has been impossible heretofore to detect the presence of the blood and hence many eggs which should be properly classified as "rejects" or unmarketable eggs have been classified and sold in one of the other numerous classes under which the marketable eggs are sold.

Heretofore it has been the practice to classify eggs by subjecting them to what is commonly referred to as a "candling" operation. To those skilled in the art this candling operation is well understood and is one whereby light is projected through the egg and the contents of the egg are examined, as well as they can be under the circumstances, by the human eye. When the blood content or spot in the egg is very material in area, that is when there is a large blood spot, it is usually, but not always, possible to detect this during the candling of the egg. When the blood spot is small it is almost invariably missed, because it cannot be seen when the egg is candled and consequently many unmarketable "blood" eggs are sorted into marketable classes and are sold to the public at varying prices in accordance with whatever class the candler sorts the blood egg into. When the blood spot is small and is missed the egg will oftentimes be classified as a first or best quality egg notwithstanding the fact that the egg is actually bad and should not be sold at all.

Recognizing the foregoing, one of the primary objects of the present invention is the provision of a method and apparatus by which the presence in an egg of any blood in any form whatsoever can be unerringly detected.

A further object is that of the provision of a method as above described which is extremely cheap of operation and yet highly efficient in classifying or sorting eggs in large batches or quantities.

Another object is that of providing an apparatus for the practice of the described method which is comparatively cheap of manufacture and upkeep yet highly efficient in operation.

Other objects, novel features of construction and improved results of the invention will become apparent from a reading of the following specific description in conjunction with the accompanying drawing which illustrates one embodiment which an apparatus may take in practicing my novel and improved method.

In the drawing:

Fig. 1 is a schematic plan view illustrating an apparatus found to be satisfactory in practice of the present method.

Fig. 2 is an illustration of the electric circuit utilized in the apparatus appearing in Figure 1 of the drawing.

Fig. 3 is a fragmentary view in vertical section of the light box.

Describing the invention in detail and having reference particularly to Figure 1 of the drawing, A designates a lamp box or housing within which is disposed a light source B which in this instance is in the form of an electric filament light the current for which is obtained over the main input wires 9 and 10 through the take-off wires 1 and 2. The input lines 9 and 10 are plugged into any suitable source of electric supply (not shown) by means of a plug 3.

The particular attribute which must be incorporated into the light B is that it generate an abundance of radiant energy waves within the wave band between 12,000 and 14,000 angstrom units. It is also desirable that the light source be of filament type in that it is highly desirable to focus and magnify the image of the filament upon the egg which is to undergo examination or test.

Behind the light a parabolic reflecting lens C is positioned and is preferably provided on its concave face with a pure silver reflecting surface which has been electrolytically deposited to a depth of from three to five ten-thousandths of an inch. A reflector of this type will not absorb the long wave lengths of radiant energy which are essential, as will hereinafter more clearly appear, in the practice of the present invention. Additionally the reflecting surface will not check or crack due to expansion and contraction of the reflector by reason of its being subjected to the heat generated by the closely adjacent light source.

By reference to Figure 3 of the drawing it will be seen that the front wall 4 of the lamp box or housing is provided with an opening defined by an internally threaded ring 5 within which is threadedly mounted a carrier 6 within which are mounted in separated spaced relation a calcite lens 30 and a fluorite lens 31. Externally of the housing the carrier 6 is threaded and receives and supports a ring 32 within which is positioned an iris diaphragm 33 which is adjustable by a lever 34. Threadedly mounted on the ring 32 is a second ring 35 within which is positioned a normally closed shutter 36 operable by a handle 37.

The electric light B and reflector C are mounted on a common base W which by reason of a shaft 38 threadedly mounted in the front wall 4 of the lamp box as at 39 and threadedly adjustable as at 40 in a bracket 41 makes it possible to adjust the light and reflector forwardly and rearwardly in respect to the lenses. The reflector is mounted on a bracket 42 and is adjustable vertically thereon and can be clamped in its adjusted position by means of a suitable bolt 43 or the like. The reflector bracket 42 has a base 44 which is adjustable transversely of the main base W. The construction just described permits the reflector to be adjusted vertically and sideways as well as forwardly which makes it possible together with the adjustability of the light to obtain correct alignment to image the light filament on an egg as will hereinafter more fully appear.

Inasmuch as the light generates a very considerable amount of heat it has been found desirable to ventilate and cool the lamp box and accordingly an electrically driven fan 45 is provided the motor of which is electrically connected to the current input lines 9 and 10, as clearly appears in Figure 1 of the drawing. The air injected into the lamp base escapes through its top 46 and in its passage through the box tends to cool the reflector and the light, as well as the lenses and to keep the temperature within the box sufficiently reduced so as to assure no injury or detrimental effects upon the lenses or reflector.

A housing D of any suitable type is provided in its front wall with an opening adapted to receive a portion of the side of an egg F. The egg F is supported in the opening, as illustrated in Fig. 1, by a suitable support or bracket arm G which is adjustable to accommodate eggs of varying sizes. The egg is disposed with its long axis in a horizontal plane and extending transversely of the front of the housing or box D so as to present a large portion of its exterior side wall area to the radiant energy waves which are projected from the lamp box or housing A.

Within the box D the major portion of the electric circuit illustrated in Fig. 2 of the drawing is disposed and one of the elements in said electric circuit is a radiant energy responsive cell or like element designated as an entirety by H. By reference to Fig. 1 of the drawing it will be seen that the cell or element is so positioned as to be in the path of the waves which are projected through the egg F and the opening in the front of the housing or box D. The box D contains this cell referred to as a radiant energy responsive cell together with an electric amplifying circuit the output lines of which are designated at 7 and 8. The input lines to the circuit are designated at 9 and 10 respectively and are connected to a 115 volt sixty cycle alternating current source of supply.

The output lines 7 and 8 are shown as being electrically connected to two different instrumentalities either of which will visually indicate whether or not the egg under test contains blood. One of the instrumentalities is a suitable calibrated meter K which operates in general on the principle of a galvanometer. The meter is provided with a pointer 11 movable over a dial which at its left end has a division 12 carrying indicia such as a "Rej." meaning reject to designate a blood egg, and a second division 13 carrying the word "Pass" which will indicate that the egg does not contain blood and will pass as not being a reject egg.

The second indicating mechanism is designated at L and can be in the form of a box having two compartments each of which has a glass front. The glass of one compartment carries indicia reading "Reject" as indicated at 14, and the glass of the other compartment carries the word "Pass" as indicated at 15. The second indicator L is also connected to the amplifier output lines 7 and 8. This electrical connection is obtained by a wire 16 leading from the meter to a shunt resistor 46 thus connecting the output wire 7 to the resistor. The output wire 8 also leads to the resistor. From the resistor a pair of wires 47 and 48 lead to a relay 49.

Within each of the indicator boxes there is an electric light 50 and 51 respectively which are connected to the relay by wires 52 and 53 and to the main input electric wires 9 and 10 by wires 54 and 55. The supplemental input line 55 is connected through the relay 49 as indicated at 56.

The manner of operation of the signals or indicators K and L will more specifically appear hereinafter.

The present method and apparatus operates upon the principle of determining by spectroscopic analysis the presence or absence within the egg of blood. I have found that the fundamental frequency or the absorption wave length of avian blood, particularly chicken blood irrespective of the breed or geneology, lies within a wave band between 12,600 and 14,000 angstrom units. Repeated laboratory tests have proven that irrespective of the breed or geneology the fundamental frequency or absorption band between various breeds of American domestic fowl or chickens does not vary over ten one-hundredths to fifteen one-hundredths of an angstrom unit.

Inasmuch as the method and apparatus operates upon the principle of determining the absorption by the egg, which means of course the absorption by any blood within the egg, of radiant energy waves lying within the fundamental absorption wave band of avian blood it is necessary to provide or construct the cell or element so that it will be responsive in the electric circuit to only that particular wave length.

I have found a cell constructed as immediately hereinafter described to be highly satisfactory in operation. There is the usual glass envelope within which is disposed a cathode or plate 23 and anode 24. The envelope is constructed or composed of the highest quality Crown or Jena glass and is highly evacuated and then filled with a small quantity, I have found one part in one hundred to be very satisfactory, of inert gas such as argon, xenon or krypton. The cathode is semicircular in cross sectional configuration and I have found that providing it with nine-tenths of a square inch surface is highly satisfactory. The surface of the cathode is coated, by baking and dehydrating, with a solution of magnesium oxide, and caesium in equal quantities. A cell as thus constructed constitutes a highly sensitive detecting medium for light waves of lengths between 12,600 and 14,000 angstrom units.

The arrangement of the amplifying circuit used in combination with the photoelectric detector will be perfectly clear to those skilled in the art and a wire by wire description thereof is considered unnecessary. Those skilled in the art likewise recognize that the cell is peaked for maximum response to radiant energy in the specific wave lengths enumerated to pass current and that the amplifying circuit is utilized to step up or increase the volume or power of the circuit output of current and is so balanced that such minute response as is given by the cell to wave lengths other than those specified will not act sufficiently on the cell or circuit as to permit the cell to pass current.

Current supply or input lines 9 and 10 are connected to a voltage regulator M which accurately regulates the primary voltage to one-half of one percent, plus or minus, of 115 volts. From the voltage regulator the current passes to a transformer N from the secondary of which lead the take-offs 25, 26 and 27. Three hundred and fifty volts is imposed across the lines 25 and 26 and a like voltage is imposed across the lines 26 and 27.

From the transformer there are also the outlets Y—Y and Z—Z which are connected respectively to the terminals Y—Y of the tubes P and Q and the terminals Z—Z of the tube R.

I have found it possible to utilize standard radio tubes which are purchasable in most any retail store handling radio equipment, and the tube P is commonly referred to as a 6C6, the tube Q as a 6L6, and the tube R as a 6H6.

The relay 49 and its shunt resistor 46 provide a means which through and due to prior calibration will cause the light behind the "Reject" box 14 of the indicator L to light only in response to currents applied within specific predetermined limits, and likewise the light behind the "Pass" box 15 will light only in response to currents applied within specific predetermined limits. That is to say, the current supplied or led to the relay 49 is received over the output wires 7 and 8 from the amplifying circuit and the relay acts to close the circuit to the "Reject" or "Pass" box respectively of the indicator L in response to the intensity of the current output of the amplifying circuit. The movement of the indicating pointer 11 over the dial of the meter K is also responsive to the intensity of current or signal output from the amplifying circuit over the output wires 7 and 8. The mode of operation of these parts will appear more fully when a description of the operation of the entire device is given.

For the purpose of permitting the operator to selectively use either the meter K or the indicator L or both simultaneously a single throw double pole switch 57 is provided in the electric circuit running to these instruments.

In operation it will be apparent that when the egg under test contains no blood there will be no absorption of the wave length of radiant energy projected through it, with the result that the cell will respond at its maximum to pass potential in the circuit and that this passed potential will be amplified by the amplifying circuit. The indicating mechanism will be calibrated whereby the needle 11 of the meter K will move over the portion 13 of its dial to indicate that the egg should pass and not be rejected. Simultaneously through the action of the relay and the shunt resistor only the light in the box 15 will be illuminated so as to make visible to the operator the word "Pass" on its glass front. When the egg contains blood there will be absorption of the specific wave lengths in proportion to the volume or quantity of blood within the egg and the indicating needle 11 will be positioned somewhere upon that portion 12 of its dial indicating a blood egg. Incidentally I have found that the mechanism will detect with unerring accuracy and certainty eggs which have blood spots no larger than one-sixteenth of an inch in diameter. The size of the blood spot or the quantity of the blood within the egg can be determined by the degree to which the pointer or needle 11 moves towards the right or towards the "Pass" portion of the meter indicating dial. When the egg is a blood egg the relay and the shunt resistor act to close the circuit only to that light in the box 14 so as to illuminate the glass front thereof bearing the word "Reject." The delicacy of the apparatus will become apparent by comparing the size of the blood spot with the total volume of the contents of the egg. When the blood spot is so small as one-sixteenth of an inch in diameter its relation to the egg as an entirety has a ratio closely approximating one to ten thousand but notwithstanding this fact the apparatus has by actual test proven itself to be infallible in the detection of blood eggs.

The signal output or impulse of the radiant energy responsive cell or element is comparatively weak or small but is stepped up, as previously described, by the amplifying circuit. This step-up is sufficient to actuate the associated mechanism to indicate and designate whether or not the egg under examination contains blood.

The amplifying circuit disclosed in the drawing steps up the potential or E. M. F. passed by the cell to a very considerable degree. The ratio of current passed by the cell to the total output of the amplifier is about one thousand to one hundred thousand.

I have found that by the present apparatus and method it is possible to accurately detect blood when present in the contents of the egg irrespective of the form in which the blood exists, that is to say, irrespective of whether the blood is in or substantially in a liquid state or is coagulated. This means that the present method detects, when they are present, what are commonly termed "meat spots" inasmuch as such spots are in reality a blood formation or at least are made up to a large degree of blood.

The apparatus illustrated in the drawing is one which I have found suitable to practice the present method but the invention is to be limited only by the scope of the hereinafter appended claims.

It will be obvious that the shutter 36 should be opened only when an egg is in place to be tested. It will be equally as obvious that the manual operating handle 37 could be replaced by any one of several automatic means for opening the shutter when an egg is placed in position to be tested.

I claim:

1. The method of determining without breaking or impairing in any respect whatsoever or adding to or taking anything away from an egg whether blood is present as a part of the interior contents of the egg consisting in, projecting through the egg radiant energy waves of lengths including those of the characteristic absorption band of avian blood, providing an electric amplifying circuit and a source of electric current supply therefor, placing a radiant energy responsive cell which is responsive only to radiant energy in said specified band in said circuit to control by electrical conductance the passage of current through said circuit, allowing the energy waves which have passed through the egg to fall upon said cell, and then measuring by an instrument operated by the current permitted to flow in said circuit by said cell the energy output of said circuit.

2. The method of determining without breaking or impairing an egg in any respect whatsoever whether blood is present as a part of the interior contents of the egg consisting in, projecting through the egg radiant energy waves of lengths including those of the characteristic absorption band of avian blood, providing an electric amplifying circuit and a source of electric current supply therefor, placing a radiant energy responsive cell which is responsive only to radiant energy in said specified band in said circuit to control by electrical conductance the passage of current through said circuit, allowing the energy waves which have passed through the egg to fall upon said cell, and then ascertaining the degree of absorption of said radiant energy waves within the characteristic absorption band of avian blood by the contents of said egg by measuring by a suitable instrument actuated by said circuit the current output of said circuit.

3. An apparatus for determining the presence or absence of blood in the interior of an egg comprising, a light source capable of generating an abundance of radiant energy waves in the frequency band between 12,600 and 14,000 angstrom units, means to project the energy waves generated by said light source through an egg, a support for maintaining said egg in the path of travel of said energy waves, a radiant energy responsive element positioned so that the energy waves which pass through said eggs play upon it, an electric circuit and a source of current supply therefor, said radiant energy responsive element being peaked to be activated only by radiant energy waves within the specified band and being connected in said circuit and upon being activated acting to produce a change in its electrical conductivity to permit a flow of current through said circuit, and an indicator operable by the electrical output of said circuit as permitted by said radiant energy responsive element to register the intensity or strength of said output and thereby indicate in comparison with a bloodless egg the degree to which said specified wave lengths of radiant energy have been absorbed by the interior contents of the egg.

4. A construction such as defined in claim 3 wherein, the indicator carries indicia indicating the presence or absence of blood within the egg, electric lights associated with said indicator to selectively illuminate the different indicia thereon, a source of current supply for said lights, electrically operated mechanism for closing the circuit to one or the other of said lights and said circuit closing mechanism electrically connected to the main circuit and operable thereby in accordance with the intensity of the electrical output caused in said circuit by the activation of said radiant energy responsive element.

5. The method of determining whether an egg contains blood consisting in, subjecting the egg to a spectrum absorption analysis and recording the outcome of said analysis in the terms of strength of an electric current permitted to flow in an electric circuit by reason of the response of a radiant energy operated electrical conductance element which acts only in response to radiant energy of the characteristic absorption band of avian blood which is projected through said egg and onto said element, and comparing the finding of said analysis with a like spectrum absorption analysis finding in respect to an egg known to contain no blood.

6. The method of determining without breaking or impairing an egg in any regard whatsoever whether the egg contains blood, consisting in projecting through the egg radiant energy of those wave lengths which will be absorbed by avian blood, determining the degree to which said wave lengths are absorbed by the interior contents of said egg, and comparing said finding with a similar finding in respect to an egg the interior contents of which are known to contain no blood.

7. The method of determining, without breaking or impairing an egg in any manner whatsoever, whether the interior contents of the egg contain blood, consisting in projecting through said egg radiant energy of that wave length which constitutes the fundamental and characteristic absorption band of avian blood, finding whether or not any or how much of the radiant energy within said wave band is absorbed by the interior contents of said egg, and causing said finding to be visually indicated on an instrument calibrated with a similar finding in respect to an egg known to contain no blood to indicate the degree to which said radiant energy has been absorbed and to thereby visually indicate whether said egg contents contain blood and if so the substantial amount of blood contained thereby.

WILLIAM D. DOOLEY.